Fig. II

Feb. 1, 1966 T. A. RIBICH 3,231,982
APPARATUS FOR CHECKING CUTTER GEOMETRY
Filed July 10, 1961 5 Sheets-Sheet 2

INVENTOR.
THOMAS A. RIBICH
BY
Wardling, Krost, Granger & Rust
Attys

Feb. 1, 1966 T. A. RIBICH 3,231,982
APPARATUS FOR CHECKING CUTTER GEOMETRY
Filed July 10, 1961 5 Sheets-Sheet 3

INVENTOR.
THOMAS A. RIBICH
BY
Woodling, Krost, Granger + Krost
Attys.

Feb. 1, 1966 T. A. RIBICH 3,231,982
APPARATUS FOR CHECKING CUTTER GEOMETRY
Filed July 10, 1961 5 Sheets-Sheet 5

INVENTOR.
THOMAS A. RIBICH
BY
Woodling, Krost, Granger + Rust
Attys.

United States Patent Office 3,231,982
Patented Feb. 1, 1966

3,231,982
APPARATUS FOR CHECKING CUTTER GEOMETRY
Thomas A. Ribich, Cleveland, Ohio, assignor to The Weldon Tool Company, a corporation of Ohio
Filed July 10, 1961, Ser. No. 122,776
19 Claims. (Cl. 33—201)

The present invention relates in general to an apparatus for checking the geometry of various type cutters and more specifically to such apparatus for checking the geometry of fluted type tools.

An object of the present invention is to provide an apparatus or device for checking the helix angle of a fluted tool.

Another object of the present invention is to provide a device for checking the width of the peripheral land of a fluted type tool such as an end mill which land is sometimes referred to as a primary back-off surface.

Another object of the present invention is to provide a device for checking the peripheral relief angles of fluted tools such as for example end mills which are sometimes referred to as the relief angles of the primary and secondary back-off surfaces.

Another object of the present invention is to provide a device for checking the radial rake angle of a fluted type cutter.

Another object of the present invention is to provide a means of checking the peripheral relief angles and radial rake angles of fluted type cutters such as end mills by the use of a device which includes a checking member which has front and rear parallel surfaces with the front surface being alignable with the primary and secondary back-off surfaces and with the rear edge of the checking member being alignable with angular indicia means, and the checking member also including a radial rake finger with a surface thereon at right angles to the rear edge and engageable with the cutting face of the tool.

Other objects and a fuller understanding of this invention may be had by referring to the following description and claims, taken in conjunction with the accompanying drawings, in which:

Figure 1:
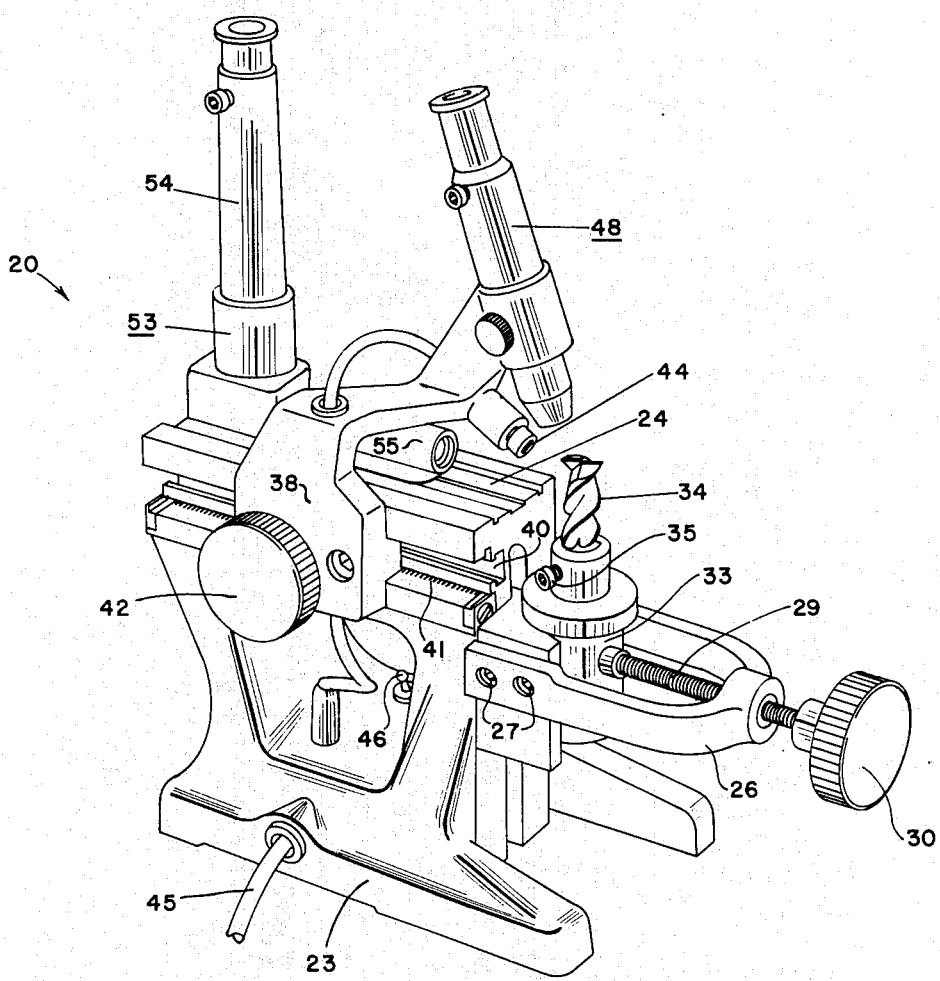
FIGURE 1 is a perspective view of the apparatus of the present invention with the components thereof in place which are necessary for checking the helix angle and the width of peripheral land of a fluted cutting tool.
Figure 3:
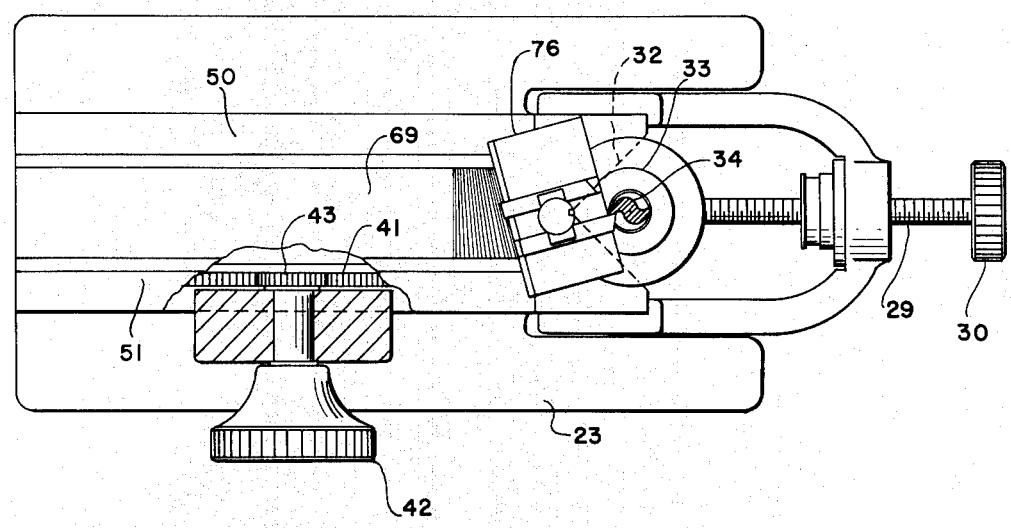
FIGURE 3 is generally a plan view of the device shown in FIGURE 1 and showing the right angle magnification means removed from the apparatus and with the components in place on the apparatus which are necessary in checking the peripheral relief angles of the fluted cutting tool as well as the radial rake angle thereof.

Referring specifically to FIGURE 1, there is shown therein an apparatus for checking the geometry of a fluted cutting tool indicated by the reference numeral 20. For the purpose of illustration only, the description will deal exclusively with checking the geometry of an end mill, however, it will be appreciated by those skilled in the art that the device may be utilized for checking the geometry of many different types of cutting tools. The device as shown in FIGURE 1 shows the combination of elements for checking what has been referred to as the helix angle of the tool as well as the width of the peripheral land. The combination of elements for checking the peripheral relief angles and the radial rake angles are not shown in FIGURE 1, but are shown in FIGURE 3 and following figures. The apparatus shown in FIGURE 1 includes a base 23 and supported by the base are wall means 24 which provide and define a generally horizontally disposed guideway. Support means are also secured by the base 23 and are located at the right end of the base as viewed in FIGURE 1. The support means includes a yoke 26 appropriately secured to the base by means of screws 27. The yoke is provided with a threaded opening through which passes a threaded holding rod 29 to which is attached a knob 30. The support means also includes a V-type wall 32 adapted to receive a cylindrical holder 33 which holder receives the shank of an end mill 34. A screw 35 is adapted to be tightened and loosened when it is desired to remove or place an end mill in the holder 33. The holder is held in place by engaging the same with an end of the holding rod 29 opposite the knob 30. This construction is such that the end mill is held in a position at the end of the guideway 24 with the axis of the tool extending in a vertical direction when considering the guideway to be in a horizontal position.

Figure 2:
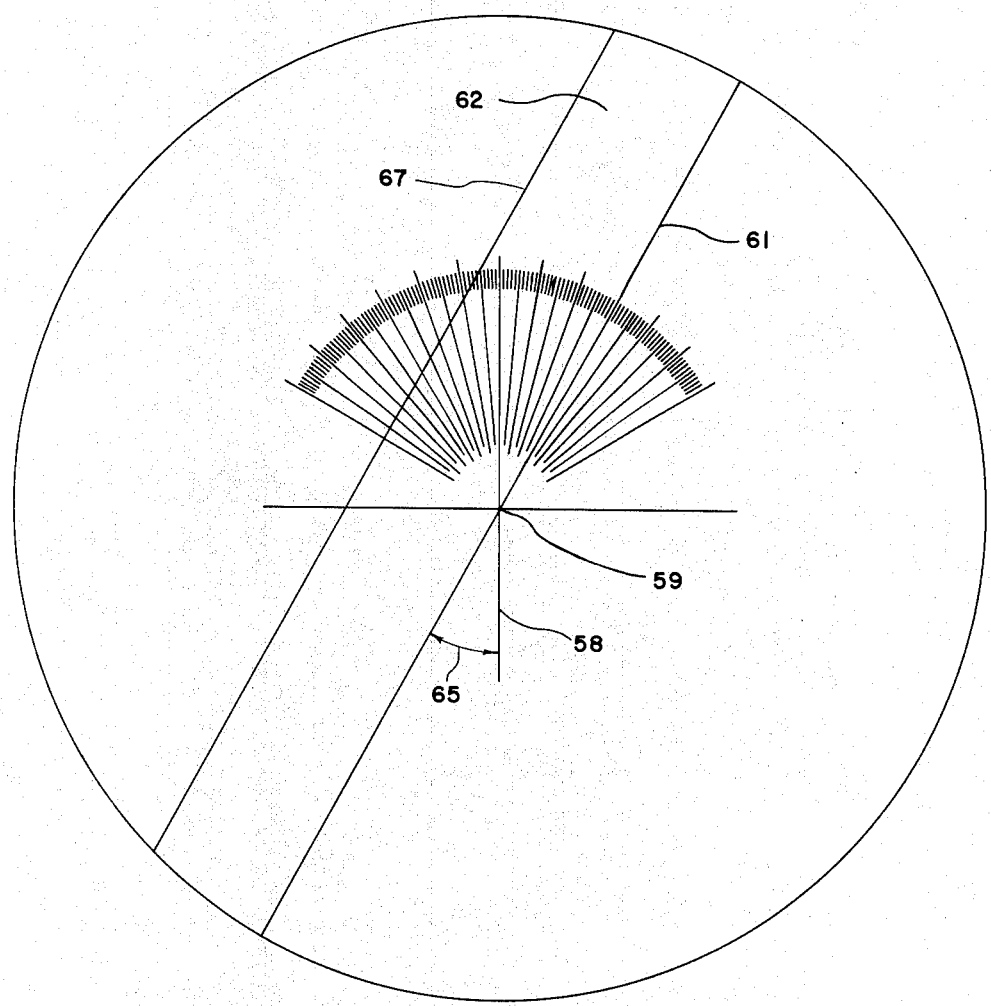
FIGURE 2 is an illustration of what is seen by the operator of the apparatus shown in FIGURE 1 when observing the cutting tool through the right angle type optical magnification means.
Figure 4:
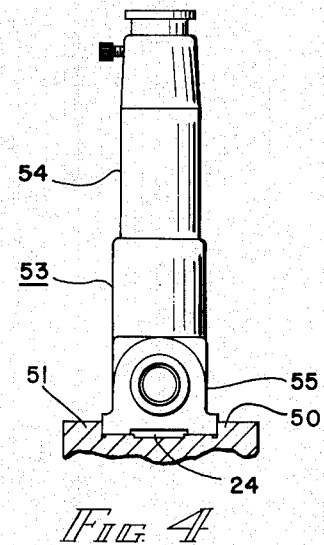
FIGURE 4 is an end view of the right angle optical magnification means and a portion of the guideway in which it resides.
Figure 11:
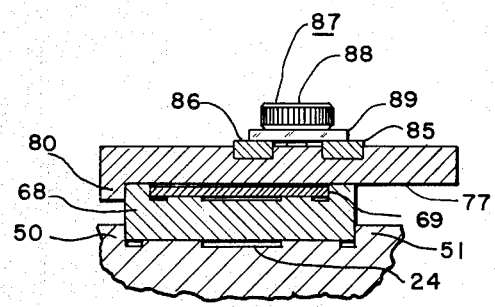
FIGURE 11 is a view taken generally along the line 11—11 of FIGURE 5.

A movable carriage 38 is mounted for back and forth movement on one side of the base 23. The mounting of the movable carriage 38 includes a key type guideway 40 on the base and a corresponding portion on the carriage 38 interfits with the guideway 40 to maintain the two parts in operative relationship with each other. Rack type gear teeth 41 are provided on the base part and a hand knob 42 is connected in a conventional manner to a pinion type gear 43. In other words, by turning the knob 42 in a clockwise direction shown in FIGURE 1, the carriage moves to the right and by turning the knob in a counterclockwise direction, the carriage moves to the left. Mounted by the movable carriage and of course movable therewith is a light source 44 which is supplied electrical energy through a conventional cord 45 through a switch 46. Also mounted by the carriage 38 is an optical magnification means 48. The magnification means 48 is set at an angle which is such that the light source and the area focused in upon by the magnification means meet at the same place which is the area of the cutting edge of the tool which is to be observed. The guideway 24 which is mounted by the base is comprised of first and second opposed side walls or rails 50 and 51 (sometimes referred to as a support member) respectively (FIGURES 3, 4 and 11). Mounted in the guideway for sliding movement therein is second optical magnification means 53. The optical magnification means 53 includes a vertical portion 54 and a horizontal portion 55. The optical magnification means 53 is conventional and includes an eye piece lens in the vertical portion and an objective lens in the horizontal portion. A mirror type member is mounted at a 45 degree angle at the corner between the vertical and horizontal portions 54 and 55 which enables a person using the device to look into the vertical portion and observe the tool 34 at the end of the guideway. The optical magnification means 53 is provided with a reticle (FIGURE 2) in the nature of a protractor which is subdivided from 0 to 60 degrees on either side of a vertical center line 58. The construction of the optical magnification means 53 is such that when placed in the guideway 24 the axis 59 of the horizontal portion 55 intersects and lies at right angles to the axis of the tool 34. FIGURE 2 is the view which a person observes while looking through the optical magnification means and is a view of a portion of a flute of the tool 34. The parts of the tool 34 observed are the cutting edge 61 and the land or primary relief surface 62.

In other words, to check the helix angle (the angle the cutting edge makes with the tool axis) and the width of peripheral land of the tool it is necessary to place the tool in the holder 33 in the manner described hereinabove. The tool is positioned in the holder in such manner that the axis 59 of the horizontal portion of the optical magnification means 53 intersects the axis of the tool and in addition passes through a point on the cutting edge 61. The exact manner of aligning the tool in such manner will be described in conjunction with the elements used in checking the peripheral relief angles of the tool and the radial rake angle. The helix angle of the tool is the angle made by the cutting edge 61 and the vertical center line 58. The angle shown in the specific instance of FIGURE 2 has been designated by the reference numeral 65 and in this instance is approximately 30 degrees. It has been found that within the limits of use of the present apparatus that each degree indicated on the reticle equals approximately .001 inch. In other words, to determine the width of the land 62 it is necessary to read the number of angles between the cutting edge 61 and the line 67 which defines the end of the primary relief surface. In this specific instance, the angular relationship is 35 degrees and multiplying this by .001 gives a land width of .035 inch. This method is accurate within the limits required.

Figure 7:
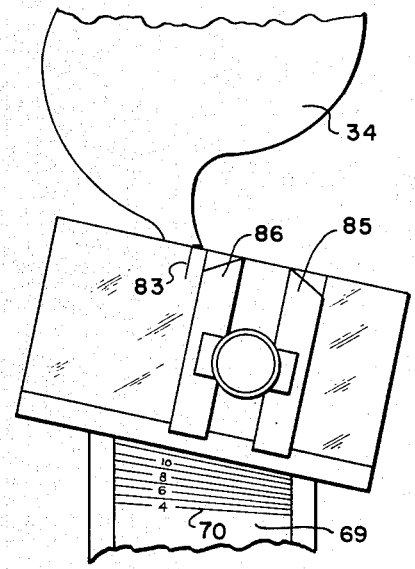
Figure 8:
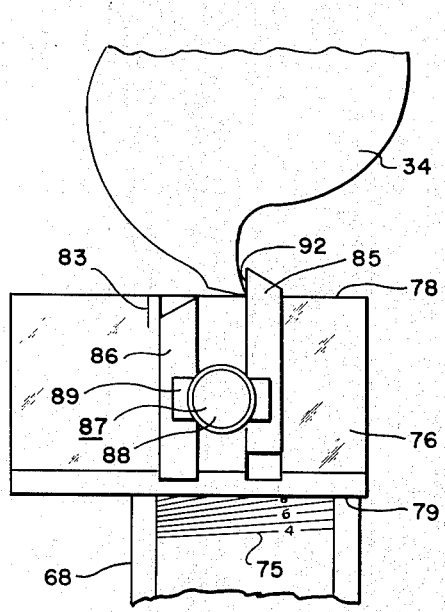
FIGURES 8 through 10 illustrate the sequence of steps gone through in order to check the radial rake angle of a fluted cutting tool.
Figure 9:
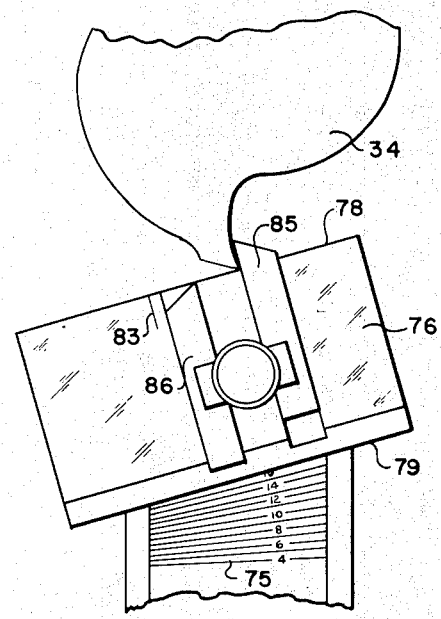

The construction utilized to check the peripheral relief angles and the radial rake angles of the tool 34 are best illustrated in FIGURES 3 and 5 through 11. In this construction the optical magnification means 53 are removed by merely sliding the same out of the left end of the guideway 24 and inserted in the guideway is a holder 68 which carries an angle slide 69. The angle slide is slidable in the holder 68 toward and away from the tool 34 which is adapted to be checked and the direction of movement may be described as a straight line direction. As will be noted the angle slide 69 is such that it is slightly below the sidewalls of the holder 68. The angle slide is provided with angular indicia means 70 on one side thereof (FIGURES 5 through 7) and is also provided with angular indicia means 75 on the opposite side thereof (FIGURES 3, 8 and 9). The angular indicia means 70 and 75 are measured or calibrated with respect to a line drawn at right angles to the straight line direction in which the angle slide is adapted to slidably move. The only difference between the angular indicia means 70 and 75 is that the angular indicia means 70 might be said to be drawn in the second trigonometric quadrant whereas the angular indicia means 75 are drawn in the first quadrant. A checking block or member 76 is provided which has a flat bottom surface 77 which rests on the opposed sidewalls of the holder 68. The checking block has front and rear parallel edges 78 and 79 respectively and a downwardly extending aligning shoulder 80 for engaging with one of the sidewalls and the construction of the aligning shoulder is such that when brought into full contact with the sidewall 71 of the holder it positions the front and rear parallel edges 78 and 79 at right angles to the straight line sliding direction of the angle slide 69. A center line or aligning mark 83 is provided on the checking block 76 and is for the purpose of properly locating a portion of a cutting edge 61 on the tool which is to be checked. The aligning mark 83 when coinciding with the cutting edge 61 positions the tool in such manner that a radius line of the tool extends through the portion of the cutting edge to be checked and in the straight line direction referred to which in turn is at right angles to the front and rear parallel edges 78 and 79. It will be noted that the angular indicia means 70 and 75 are calibrated in such manner that the angular position of the rear edge 79 can be read therefrom.

Figure 5:
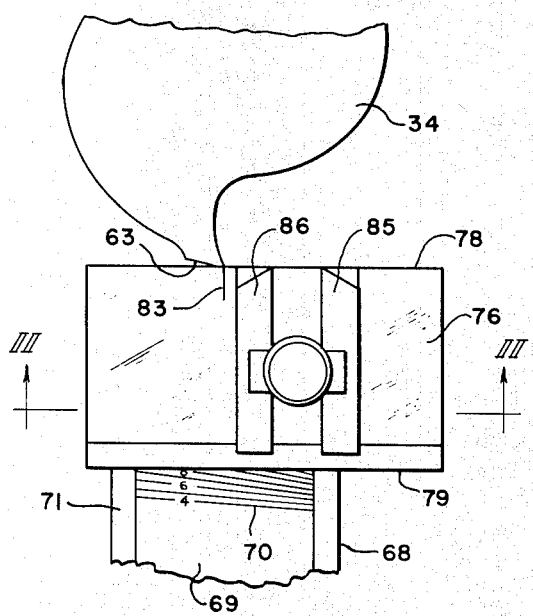
FIGURES 5 through 7 illustrate the sequence of steps gone through in order to check the primary and secondary relief angles of a fluted cutting tool.
Figure 6:
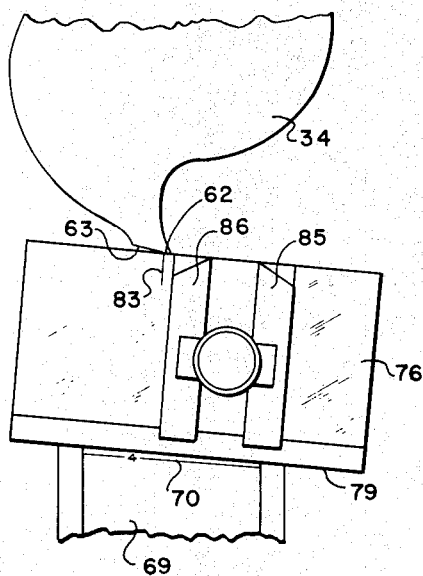
Figure 10:
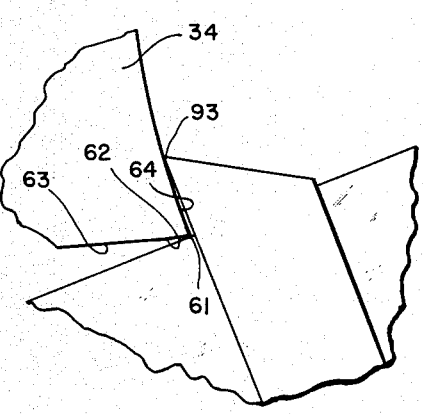

FIGURES 5, 6 and 7 best illustrate the operation of the device in checking the peripheral relief angles of the tool 34. As best seen in FIGURE 10 the cutting edge 61 of the tool is shown and includes both the primary relief surface 62 and also a secondary relief surface 63. The primary and secondary relief surface extend at different angles with respect to a tangent passing through a point on the cutting edge 61. In order to properly check the primary and secondary relief angles, the tool 34 in the holder 33 is aligned so that the point on the cutting edge 61 which is to be checked exactly coincides with the aligning mark 83 on the checking block when the shoulder 80 snugly engages the side wall 71 of the holder or secondary guideway 68 at all places therealong. This positions the parts as shown in FIGURE 5. While observing this area of the cutting edge through the optical magnification means 48 with the light source 44 preferably turned on, the checking block 76 is swung or pivoted so that the front edge 78 thereof flatly engages the primary relief surface 62. When this has been accomplished, the angular position of the primary relief surface 62 is read by comparing the parallelism of the rear edge 79 with the angular indicia means 70 on the angle slide 69. This is shown in FIGURE 6 which indicates that the peripheral relief angle of the primary relief surface is 4 degrees.

In order to check the peripheral relief angle of the secondary relief surface 63 the checking block is swung still further in the manner shown in FIGURE 7 until the front edge 78 is in engagement therewith. The angle is read by comparing the rear edge 79 with the angular indicia means 70 on the angle slide. The secondary relief angle as shown in this figure is approximately 12 degrees. To check an opposite type tool the angle slide must be turned over and the checking block must be swung in an opposite direction.

The upper surface of the checking block 76 is provided with first and second slots in which reside first and second radial rake fingers 85 and 86 respectively. The radial rake fingers 85 and 86 are provided with a holding or adjustment means 87 in the nature of a thumb screw 88 and a holding member 89. When the thumb screw 88 is loosened the radial rake fingers may be moved in the slots and when the thumb screw is retightened the holding member secures the rake fingers in a fixed position. In order to check the radial rake of the cutting face 64 of the tool which in this instance is a right hand tool, it is first necessary to loosen the thumb screw 88 to slide the first radial rake finger 85 forward (FIGURE 8). As will be noted each of the radial rake fingers is provided with a surface 92 which is at right angles to the front and rear edges 78 and 79 on the checking block. It is also necessary to turn the angle slide 69 over in the guideway in order that the angular indicia means 75 be observable. The next step which is necessary is to swing the checking block in a generally counterclockwise direction as seen in FIGURES 8 and 9 to bring the surface 92 of the radial rake finger 85 into substantially flat contact with the cutting face 64 of the tool. It will appreciated by those skilled in the art that the exact point 93 on the radial rake finger cannot be seen when viewing the tool through the optical magnification means 48 because the continuation of the cutting edge 61 in a helical direction obscures this point from view.

As a result, it is necessary for the person observing this procedure to observe a slight separation at substantially the exact cutting edge 61 as shown in FIGURE 9. When the slight separation shown just starts to occur, then the person using the device knows that he has reached a point where he can go no further. This is the point at which he knows that the surface 92 is substantially flat with the cutting face. The radical rake angle is then observed by comparing the rear edge 79 of the checking block with the angular indicia means 75. In this instance the rake angle is substantially 16 degrees. It will thus be seen that the angular indicia comprises a plurality of spaced lines, each adjacent one of which extends at a slightly different angle with respect to a reference line which extends through these lines and the tool or tool securing means. In this way an appropriate line can be found to compare with the surface on the checking block. To check the radial rake angle of an opposite type tool rake finger 86 is used and the angle slide must be reversed and the checking block is swung in an opposite direction. It will be appreciated that the distance which the rake finger extends from the front edge 78 will vary depending on the size tool being checked because in turn the flat portion of the cutting face will vary.

As a result thereof, it will be seen than an apparatus has been provided which is capable of checking the geometry of a cutter. More specifically, the device is capable of checking the peripheral land width of a tool as well as the helix angle. The device is also capable of checking the peripheral relief angles as well as the radial rake angles.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for checking the geometry of an end mill including in combination a base, wall means defining a generally horizontally disposed holder having opposed side walls and supported by said base, support means mounted by said base for supporting an end mill in a generally vertical position at an end of said holder, an angle slide residing in said holder and having side portions respectively in sliding engagement with said opposed side walls, said angle slide being slideable toward and away from the end mill adapted to be held by said support means and in a straight line direction, a checking block having a flat bottom surface resting on said opposed side walls of said holder, said checking block having front and rear parallel edges, an aligning shoulder on one side of said checking block for engagement with one of said sidewalls to position said front and rear edges at right angles to said straight line direction, a centerline mark on said front edge of said checking block for properly locating a portion of a cutting edge to be checked in such position that a radius line of the end mill which extends through said portion also extends through said centerline and in said straight line direction, a first plurality of angular marks on a first side of said angle slide to indicate the angular position of said front and rear edges when said checking block is swung in one direction, a second plurality of angular marks on a second side of said angle slide to indicate the angular position of said front and rear edges when said checking block is swung in another direction, first and second radial rake fingers carried in slots on said checking block, adjustable means securing said rake fingers in position and permitting movement of same beyond said front edge of said checking block, each of said rake fingers including a surface which is at right angles to said front and rear edges of said checking block and which is engageable with a cutting face of the end mill, a movable carriage mounted by said base, a light source carried by said carriage to illuminate a portion of the cutting edge being checked and optical magnification means carried by said carriage for enabling an operator of said appartus to better observe the portion of the cutting edge being checked.

2. Apparatus for checking the geometry of a tool including in combination a base, wall means defining a guideway holder having opposed side walls and supported by said base, support means mounted by said base for supporting a tool at an end of said guideway, an angle slide residing in said guideway, said angle slide being slideable toward and away from the tool adapted to be held by said support means and in a straight line direction, a checking block having a bottom surface resting on said opposed side walls of said guideway, said checking block having front and rear parallel edges, an aligning shoulder on one side of said checking block for engagement with one of said sidewalls to position said front and rear edges at right angles to said straight line direction, a mark on said front edge of said checking block for properly locating a portion of a cutting edge to be checked in such position that a radius line of the tool which extends through said portion also extends through said mark and in said straight line direction, a first plurality of angular marks on a first side of said angle slide to indicate the angular position of said front and rear edges when said checking block is swung in one direction, and a second plurality of angular marks on a second side of said angle slide to indicate the angular position of said front and rear edges when said checking block is swung in another direction.

3. Apparatus for checking the geometry of a tool including in combination a base, wall means defining a guideway having opposed side walls and supported by said base, support means mounted by said base for supporting a tool at an end portion of said guideway, an angle slide residing in said guideway, said angle slide being slideable toward and away from the tool adapted to be held by said support means and in a straight line direction, a checking block having a bottom surface resting on said opposed side walls of said guideway, said checking block having an edge, an aligning shoulder on one side of said checking block for engagement with one of said sidewalls to position said edge at right angles to said straight line direction, a mark on said checking block for properly locating a portion of a cutting edge to be checked in such position that a radius line of the tool which extends through said portion also extends through said mark and in said straight line direction, a first plurality of angular marks on a first side of said angle slide to indicate the angular position of said edge when said checking block is swung in one direction, a second plurality of angular marks on a second side of said angle slide to indicate the angular position of said edge when said checking block is swung in another direction, a rake finger carried by said checking block, and said rake finger including a surface which is at right angles to said edge of said checking block and which is engageable with a cutting face of the tool.

4. Apparatus for checking the geometry of a tool including in combination a guideway, support means for supporting a tool at an end portion of said guideway, an angle slide supported by said guideway, said angle slide being slidable toward and away from the tool adapted to be held by said support means, a checking block having a surface adjacent said angle slide, said checking block having an edge, a first plurality of angular marks on a first side of said angle slide to indicate the angular position of said edge when said checking block is swung in one direction, a second plurality of angular marks on a second side of said angle slide to indicate the angular position of said edge when said checking block is swung in another direction, a rake finger carried by said checking block, and said rake finger including a surface which is at right angles to said edge of said checking block and which is engageable with a cutting face of the tool.

5. A device for checking the radial rake angle of a cutting tool including in combination means for securing the tool with its axis in a vertical position, a support member, a checking block carried by said support member and having a radial rake finger with a surface thereon for engagement with the cutting face of the tool, a rear surface on said checking block which is at right angles to said radial rake finger surface, angular indicia means on said support member adjacent said rear surface, said angular indicia means comprising a plurality of spaced lines with each adjacent one of said spaced lines extending at a slightly different angle with respect to a reference line extending from the tool securing means through said spaced lines, said checking block being movable relative to said support member to move said radial rake finger surface into engagement with the cutting face of the tool and align said rear surface in parallel relationship with an appropriate one of said spaced lines.

6. A device for checking the radial rake angle of a cutting tool including in combination means for securing the tool, a support member, a checking member carried by said support member and having a first surface thereon for engagement with the cutting face of the tool, a second surface on said checking member which is at right angles to said first surface, angular indicia means on said support member adjacent said second surface, said angular indicia means comprising a plurality of spaced lines with each adjacent one of said spaced lines extending at a slightly different angle with respect to a reference line extending from the tool securing means through said spaced lines, said checking member being movable relative to said support member to move said first surface into engagement with the cutting face of the tool and align said second surface in parallel relationship with an appropriate one of said spaced lines.

7. A device for checking the radial rake angle of a cutting tool including in combination means for holding the tool, a support member, a checking member carried by said support member and having a first surface thereon for engagement with the cutting face of the tool, a second surface on said checking member, angular indicia means on said support member adjacent said second surface, said angular indicia means comprising a plurality of spaced lines with each adjacent one of said spaced lines extending at a slightly different angle with respect to a reference line extending from the tool securing means through said spaced lines, said checking member being movable relative to said support member to move said first surface into engagement with the cutting face of the tool and align said second surface in parallel relationship with an appropiate one of said space lines.

8. A device for checking the radial rake angle of a cutting tool including in combination means for securing the tool with its axis in a vertical position, a checking block having a radial rake finger with a surface thereon for engagement with the cutting face of the tool, a support member, said checking block being carried by said support member in a plane generally normal to the axis of said tool for movement in all directions in said plane, a rear surface on said checking block which is at right angle to said radial rake finger surface, angular indicia means on said support member adjacent said rear surface, said checking block when moved moving said radial rake finger surface into engagement with the cutting face of the tool and aligning said rear surface with said angular indicia means.

9. A device for checking the radial rake angle of a cutting tool including in combination means for securing the tool, a checking member having a first surface thereon for engagement with the cutting face of the tool, a support member, said checking member being slidably mounted on said support member in a plane generally transverse to the axis of said tool for movement in all directions in said plane, a second surface on said checking member which is at right angles to said first surface, angular indicia means carried by said support member adjacent said second surface, said checking block when moved moving said first surface into engagement with the cutting face of the tool and aligning said second surface with said angular indicia means.

10. A device for checking the radial rake angle of a cutting tool including in combination means for holding the tool, a checking member having a first surface thereon for engagement with the cutting face of the tool, a support member, said checking member being slidably mounted on said support member for movement in all directions in a plane, a second surface on said checking member, angular indicia means on said support member adjacent said second surface, said checking member when slidably moved moving said first surface into engagement with the cutting face of the tool and aligning said second surface with said angular indicia means.

11. Apparatus for checking the geometry of an end mill including in combination a base, wall means defining a generally horizontally disposed guideway supported by said base, support means mounted by said base for supporting an end mill in a generally vertical position at an end of said guideway, optical magnification means mounted in said guideway for sliding movement therein toward and away from said support means, said optical magnification means having a vertical portion and a horizontal portion, said support means causing the axis of said horizontal portion of said optical magnification means to intersect the axis of the end mill and also to intersect the portion of the cutting edge of the end mill to be checked, said two axes referred to being susbtantially at right angles to each other, a reticle in said optical magnification means dividing at least a portion of the field of view into angular divisions, said reticle providing a visual check of the helix angle of said portion of the cutting edge, a movable carriage mounted by said base, a light source carried by said carriage to illuminate the portion of the cutting edge being checked.

12. Apparatus for checking the geometry of an end mill including in combination a base, wall means defining a generally horizontally disposed guideway supported by said base, support means mounted by said base for supporting and end mill in a generally vertical position at an end of said guideway, optical magnification means mounted in said guideway for sliding movement therein toward and away from said support means, said optical magnification means having a vertical portion and a horizontal portion, said support means causing the axis of said horizontal portion of said optical magnification means to intersect the axis of the end mill and also to intersect the portion of the cutting edge of the end mill to be checked, said two axes referred to being substantially at right angles to each other, a reticle in said optical magnification means dividing at least a portion of the field of view into angular divisions, said reticle providing a visual check of the helix angle of said portion of the cutting edge.

13. Apparatus for checking the geometry of a tool having a helical cutting edge including in combination a base, wall means defining a guideway supported by said base, support means mounted by said base for supporting a tool at an end portion of said guideway, optical magnification means mounted in said guideway for sliding movement therein toward and away from said support means, said optical magnification means having first and second portions at right angles to each other, said support means causing the axis of said second portion of said optical magnification means to intersect the axis of the tool and also to intersect the portion of the cutting edge of the tool to be checked, said two axes referred to being substantially at right angles to each other, a reticle in said optical magnification means dividing at least a portion of the field of view into angular divisions, said reticle providing a visual check of the helix angle of said portion of the cutting edge.

14. Apparatus for checking the geometry of a tool including in combination a base, wall means defining a guideway supported by said base, support means mounted by said base for supporting a tool in a position at a right angle to said guideway and at an end of said guideway, an angle slide slideably residing in said guideway, a checking block having a planar surface resting on said wall means of said guideway and adapted for movement in all directions in the plane of said planar surface, said checking block having front and rear parallel edges, aligning wall means on said checking block for engagement with said wall means to position said front and rear edges at right angles to said guideway, a plurality of angular marks on a first side of said angle slide to indicate the angular position of said front and rear edges when said checking block is swung in one direction, a radial rake finger carried by said checking block, adjustable means securing said rake finger in position and permitting movement of same beyond said front edge of said checking block, said rake finger including a surface which is at right angles to said front and rear edges of said checking block and which is engageable with a cutting face of a tool, a movable carriage mounted by said base, and a light source carried by said carriage to illuminate a portion of the cutting edge being checked.

15. Apparatus for checking the geometry of a tool including in combination a base, wall means defining a guideway supported by said base, support means mounted by said base for supporting a tool in position at an end of said guideway, an angle slide slideably residing in said guideway, a checking block having a planar surface resting on said opposed side walls of said guideway, said checking block having a front edge, aligning wall means on said checking block for engagement with said wall means to position said front edge at a right angle to said guideway, a plurality of angular marks on a first side of said angle slide to indicate the angular position of said front edge when said checking block is swung in one direction, a radial rake finger carried by said checking block, adjustable means securing said rake finger in position and permitting movement of same beyond said front edge of said checking block, said rake finger including a surface which is at right angles to said front edge of said checking block and which is engageable with a cutting face of a tool.

16. Apparatus for checking the geometry of an end mill including in combination a base, wall means defining a generally horizontally disposed guideway supported by said base, support means mounted by said base for supporting an end mill in a generally vertical position at an end of said guideway, optical magnification means mounted in said guideway for sliding movement therein toward and away from said support means, said optical magnification means having a vertical portion and a horizontal portion, said support means causing the axis of said horizontal portion of said optical magnification means to intersect the axis of the end mill and also to intersect the portion of the cutting edge of the end mill to be checked, the end mill having a land width defined by a cutting edge line and a back off line, said two axes referred to being substantially at right angles to each other, a reticle in said optical magnification means dividing at least a portion of the field of view into angular divisions, said recticle providing a visual check of the helix angle of said portion of the cutting edge, said lines intersecting said angular divisions and the width of said land being the angular distance between the two lines expressed in thousandths of an inch, a movable carriage mounted by said base and a light source carried by said carriage to illuminate the portion of the cutting edge being checked.

17. Apparatus for checking the geometry of an end mill including in combination a base, wall means defining a generally horizontally disposed guideway supported by said base, support means mounted by said base for supporting an end mill in a generally vertical position at an end of said guideway, optical magnification means mounted in said guideway for sliding movement therein toward and away from said support means, said optical magnification means having a vertical portion and a horizontal portion, said support means causing the axis of said horizontal portion of said optical magnification means to intersect the axis of the end mill and also to intersect the portion of the cutting edge of the end mill to be checked, the end mill having a land width defined by a cutting edge line and a back off line, said two axes referred to being substantially at right angles to each other, a reticle in said optical magnification means dividing at least a portion of the field of view into angular divisions, said reticle providing a visual check of the helix angle of said portion of the cutting edge and said lines intersecting said angular divisions and the width of said land being the angular distance between the two lines expressed in thousandths of an inch.

18. Apparatus for checking the geometry of a tool including in combination support means for supporting a tool, an angle slide mounted for sliding movement toward and away from a tool adapted to be held by said support means, a checking block having a bottom surface adjacent said angle slide, said checking block having front and rear edges, a plurality of angular marks on said angle slide to indicate the angular position of one of said edges of said checking block, said checking block being located in a plane which is generally normal to the axis of a tool adapted to be held by said support means and said checking block being adapted for movement in all directions in said plane.

19. Apparatus for checking the geometry of a tool including in combination support means for supporting a tool, an angle slide mounted for sliding movement toward and away from a tool adapted to be held by said support means, a checking block having a bottom surface adjacent said angle slide, said checking block having front and rear edges, a plurality of angular marks on said angle slide, one of said edges of said checking block adapted to engage a surface on a tool with the other of said edges aligning with the angular marks to indicate the angle of a surface on a tool, said checking block being located in a plane which is generally normal to the axis of a tool adapted to be held by said support means and said checking block being adapted for movement in all directions in said plane.

References Cited by the Examiner
UNITED STATES PATENTS

| | | | |
|---|---|---|---|
| 2,648,138 | 8/1953 | Case | 33—201 |
| 2,794,362 | 6/1957 | Yale | 33—201 X |
| 2,844,885 | 7/1958 | Grady | 33—201 |

ISAAC LISANN, *Primary Examiner.*